(12) United States Patent
Bossecker et al.

(10) Patent No.: US 7,059,634 B2
(45) Date of Patent: Jun. 13, 2006

(54) GAS BAG FOR AN AIRBAG MODULE

(75) Inventors: Maximilian Bossecker, Hügelsheim (DE); Robert Getz, Ulm (DE); Hans-Peter Sendelbach, Senden (DE); Christian Weyrich, Neu-Ulm (DE); Andreas Riedel, Illerberg (DE)

(73) Assignee: Takata Corporation, Tokyo (JP)

( * ) Notice: Subject to any disclaimer, the term of this patent is extended or adjusted under 35 U.S.C. 154(b) by 274 days.

(21) Appl. No.: 10/632,100

(22) Filed: Aug. 1, 2003

(65) Prior Publication Data

US 2004/0090054 A1   May 13, 2004

(30) Foreign Application Priority Data

Aug. 7, 2002   (DE) ................ 102 36 859

(51) Int. Cl.
*B60R 21/30*   (2006.01)

(52) U.S. Cl. ..................... 280/739; 280/743.2

(58) Field of Classification Search ............ 280/729, 280/743.2, 738, 740
See application file for complete search history.

(56) References Cited

U.S. PATENT DOCUMENTS

| | | |
|---|---|---|
| 4,416,308 A | 11/1983 | Bower |
| 5,427,410 A | 6/1995 | Shiota et al. |
| 5,520,413 A | 5/1996 | Mossi et al. |
| 5,556,128 A | 9/1996 | Sinnhuber et al. |
| 5,692,774 A | 12/1997 | Acker et al. |
| 5,791,685 A | 8/1998 | Lachat et al. |
| 6,086,092 A * | 7/2000 | Hill .............................. 280/729 |
| 6,126,196 A | 10/2000 | Zimmerman |
| 6,349,964 B1 | 2/2002 | Acker et al. |
| 6,592,146 B1 * | 7/2003 | Pinsenschaum et al. . 280/743.2 |
| 6,676,158 B1 * | 1/2004 | Ishikawa ................. 280/743.1 |
| 2002/0047253 A1 | 4/2002 | Rasch et al. |

FOREIGN PATENT DOCUMENTS

| | | |
|---|---|---|
| DE | 196 46 698 A1 | 5/1997 |
| DE | 196 40 322 A1 | 3/1998 |
| DE | 298 22 159 U1 | 6/1999 |
| DE | 100 18 170 A1 | 10/2001 |
| EP | 0 788 933 A2 | 8/1997 |
| EP | 0 798 170 A2 | 10/1997 |
| GB | 2 299 061 A | 9/1996 |
| GB | 2 317 370 A | 3/1998 |
| JP | 09 142239 A | 6/1997 |
| JP | 09 249085 A | 9/1997 |
| WO | WO 00/56580 A1 | 9/2000 |
| WO | WO 01/34436 A1 | 5/2001 |

* cited by examiner

*Primary Examiner*—Paul N. Dickson
*Assistant Examiner*—Drew Brown
(74) *Attorney, Agent, or Firm*—Foley & Lardner LLP (57) ABSTRACT

A gas bag in which an orifice is opened or closed with the aid of a control band as soon as the gas bag has reached a predetermined state of deployment. One end of the control band is fastened to a gas bag envelope in the region of the orifice. The control band is connected at its other end to the gas bag envelope so that, when the predetermined state of deployment is reached, the control band slips into the gas bag envelope so that the orifice is closed by the slipped-in region of the gas bag envelope by the internal pressure of the gas bag, or the control band slips out of the gas bag envelope so that the previously closed orifice is opened.

19 Claims, 6 Drawing Sheets

GAS BAG FOR AN AIRBAG MODULE

BACKGROUND

The invention relates to a gas bag for protecting a vehicle occupant in the event of an accident.

German laid-open publication 196 40 322 A1 (incorporated by reference herein) discloses a gas bag. In this gas bag, a control band keeps an outflow orifice of the gas bag open until the gas bag has reached a predetermined state of deployment. As soon as the predetermined state of deployment is reached, the control band tears off and a closing element closes the outflow orifice of the gas bag. This gas bag has this outflow orifice, which is still open at the commencement of inflation and is closed only thereafter, arranged with a view to what are known as "out of position" situations. "Out of position" situations are those situations in which the vehicle occupant to be protected by the airbag does not assume the normal sitting position, but an abnormal sitting position, and in particular to a sitting position in which the vehicle occupant is very close to the still undeployed airbag or gas bag and is therefore struck with full force by the inflating gas bag. In order to avoid serious injuries to the vehicle occupant in such "out of position" situations, the outflow orifice is provided in the gas bag, where the outflow orifice is initially still open during the inflation of the gas bag, so that if there is premature contact of the gas bag with the vehicle occupant, the gas can escape from the gas bag so that the impact of the gas bag on the vehicle occupant is markedly diminished. When the gas bag has then reached or exceeded a predetermined state of deployment or "inflation state", it may be assumed that there is no "out of position" situation, but, instead, the vehicle occupant assumes his normal sitting position. From this moment, the outflow orifice can then be closed. This closing is carried out to ensure that the gas bag is inflated as quickly as possible and reaches its final state, that is to say its final size and final pressure, as quickly as possible.

Furthermore, the European laid-open publication EP 0 788 933 A2 (incorporated by reference herein) discloses a gas bag with two part gas bags, in which there is an overflow orifice, through which the gas can flow out of one part gas bag over into the other part gas bag (and vice versa).

SUMMARY OF THE INVENTION

One object of the invention is to provide a gas bag, in which an outflow and/or overflow orifice of the gas bag is closed particularly simply and in a gas-type manner and/or is opened particularly simply.

According to one embodiment of the invention, there is provided a gas bag, where the sealing off of the outflow and/or overflow orifice is achieved in that the orifice region of the gas bag envelope, i.e., the region in which the outflow and/or overflow orifice is arranged in the gas bag envelope, is drawn, that is to say slipped, into the gas bag envelope completely. The orifice is then sealed off in that the slipped-in envelope material is pressed together by the internal pressure of the gas bag, with the result that a virtually complete sealing off of the outflow and/or overflow orifice is achieved.

A particular advantage of the gas bag according to aspects of the invention, or of the sealing off according to aspects of the invention, is that the gas bag can be produced very cost-effectively, because there is no need for additional closing elements, such as are present, for example, in the previously known gas bag described in the above mentioned German laid-open publication 196 40 322 A1. By additional closing elements being dispensed with, the reliability of the gas bag according to one aspect of the invention is at the same time also increased; this is because each additional element, due to the ever-present risk of its failure, necessarily increases the risk of a technical defect.

The gas bag according to aspects of the invention may advantageously be implemented as two-part or multipart gas bags, i.e., gas bags with two or more part gas bags, where the outflow and/or overflow orifice may then be arranged between two part gas bags, so that, by opening or closing of the outflow and/or overflow orifice, the sequence of inflation of the part gas bags and/or the pressure in the part gas bags can thus be controlled. The outflow and/or overflow orifice thus acts as a straightforward "overflow orifice."

Additionally or alternatively, an outflow and/or overflow orifice may also be formed on the outer gas bag envelope, i.e., on the outer wall of the gas bag, so that, with the outflow and/or overflow orifice open, the gas emerges from the gas bag. In this case, the outflow and/or overflow orifice acts as a straightforward "outflow orifice." Such an outflow orifice may be provided, for example, in order to reduce the risk of injury in the event of "out of position" accidents.

According to one aspect of the invention if, with regard to an "out of position" situation, the vehicle occupant is too close to the front of the airbag or gas bag, it is considered advantageous if a control band of the bag is arranged with its other end on the side facing the vehicle occupant, because the control band then directly predetermines, virtually as a length dimension, the safety clearance which is to be adhered to by the vehicle occupant and from which a complete inflation of the gas bag, with the outflow and/or overflow orifice closed, may be considered as permissible in terms of a risk of injury.

According to another aspect of the invention, by contrast, if the vehicle occupant is next to the inflating gas bag on one side and can be struck by a sidewall of the gas bag, it is advantageous if the other end of the control band is fastened in the lateral region of the gas bag envelope. If the control band is attached laterally, the lateral spread of the gas bag is in this case a measure of whether there is an "out of position" situation or not.

According to yet another aspect of the invention, should it be simpler, for example in manufacturing terms, to fasten the control bands at points other than the actually optimal points, then it is advantageous if the control band is led over a deflection device arranged on the inside of the gas bag envelope. Thus, for example, the deflection device may be fastened to the gas bag envelope in the region facing the vehicle occupant and the other end of the control band may be fastened in the lateral region of the gas bag envelope. Such a deflection device can be formed particularly simply and therefore advantageously by a loop through which the control band is drawn.

The control band may also be connected to auxiliary control bands which are fastened with their other end at various points of the gas bag envelope. Logical "or" operations can be formed by means of the auxiliary control bands, i.e., the outflow and/or overflow orifice is closed when at least one auxiliary control band is fully tensioned.

According to another aspect of the invention, it is advantageous if at least two control bands are used, which are attached at opposite points of the outflow and/or overflow orifice. This is so because in this aspect of the gas bag, the slipped-in gas bag material is drawn apart, with the result that crumpling of the slipped-in gas bag material is avoided and particularly gas-tight sealing off by means of the internal pressure of the gas bag is achieved.

According to another aspect of the invention, virtually complete sealing off of the outflow and/or overflow orifice is achieved in an advantageous way in that the orifice is hose-shaped or blowpipe-shaped, because the slipped-in gas bag material can then be pressed together ideally by virtue of its shape, optimal sealing off thereby being achieved.

According to another aspect of the invention, it is advantageous if the control band is connected at least one point in its middle region, i.e., in the region between its two ends, to the gas bag envelope. Such a connection may be formed, for example, by a tear-open seam or a touch-and-close fastening, or the like. The function of such a fastening element is that a slipping in of the, for example, hose-shaped envelope region occurs only when the gas bag has reached a particular minimum pressure and the pressure-controlled fastening element is opened. The closing of the outflow and/or overflow orifice then takes place not only in a deployment-controlled manner, as without the fastening element, but also in a pressure-controlled manner, i.e., as a function of the internal pressure of the gas bag.

Advantageously, the gas bag according to the invention may be used, for example, as a 2-chamber side airbag. 2-chamber side airbags conventionally have a part gas-bag for the pelvic region of the vehicle occupant and a part gas bag for the thoracic region of the vehicle occupant. Preferably, in the case of a two-chamber side airbag, the outflow and/or overflow orifice is arranged between the pelvic part gas bag and the thoracic part gas bag.

The overflow orifice is preferably closed in the first inflation stage, so that the pelvic part gas bag can be inflated very quickly. As a result of the rapid pressure build-up, the vehicle occupant is pushed very quickly out of the intrusion region in the event of a side impact. After the pelvic part gas bag has performed this task, a particularly high gas pressure in the pelvic part gas bag is no longer necessary, so that the overflow orifice can be opened by means of the control band and the high gas pressure of the pelvic part gas bag can also be utilized for inflating the thoracic part gas bag. The thoracic part gas bag is thus inflated with a slight time delay. After the inflation of the thoracic part gas bag, the latter can intercept the vehicle occupant and protect him against impact on the lateral structure of the motor vehicle.

Alternatively, in the case of a two-part or multipart gas bag, the outflow and/or overflow orifice or orifices may also be activated in such a way that, in a first phase of inflation of a gas bag, the part gas bags are inflated uniformly, and that, after the conclusion of this first phase of inflation, the outflow and/or overflow orifice or orifices is/are closed, so that a different gas pressure can be formed in the part gas bags.

BRIEF DESCRIPTION OF THE INVENTION

DETAILED DESCRIPTION

Elements which are present in various exemplary embodiments bear the same reference symbols in each case in the corresponding figures.

Figure 1:
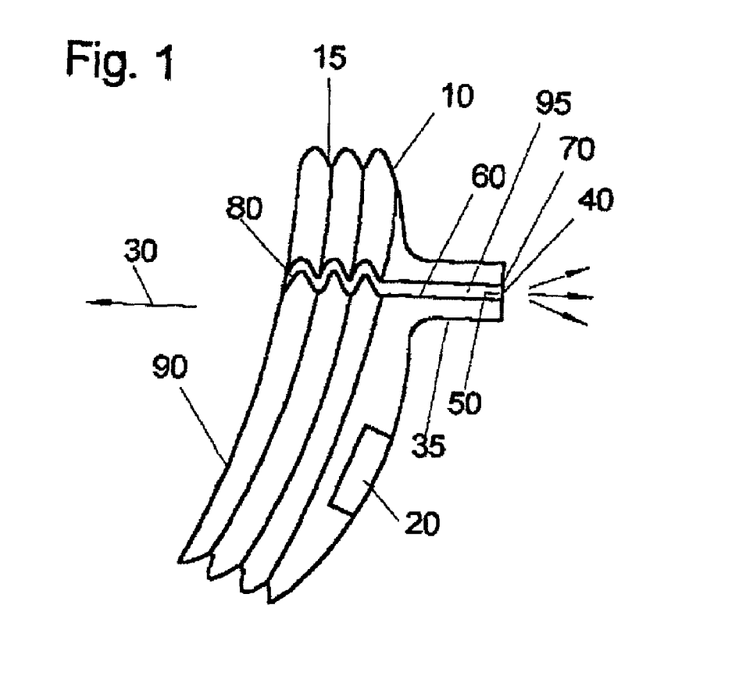
FIGS. 1 and 2 show a first exemplary embodiment of a gas bag according to the invention.

FIG. 1 illustrates a gas bag 10 with a not yet fully deployed gas bag envelope 15 which is inflated by a gas generator 20. The direction of deployment is illustrated by an arrow 30 in FIG. 1.

The gas bag 10 may have a hose-shaped or hose pipe-shaped, for example, envelope region 35 with an orifice 40, through which a gas delivered by a gas generator 20 can flow out of the gas bag 10, where the orifice 40 is designated as an outflow orifice.

In the region 50 of the outflow orifice 40, a control band 60 is fastened at one end 70. The other end 80 of the control band 60 is connected to the front region 90 of the gas bag 10. The front region 90 faces the vehicle occupant (not illustrated in FIG. 1) when arranged in the vehicle.

In FIG. 1, the outflow orifice 40 is open, so that gas delivered by the gas generator 20 can leave the gas bag 10.

Figure 2:
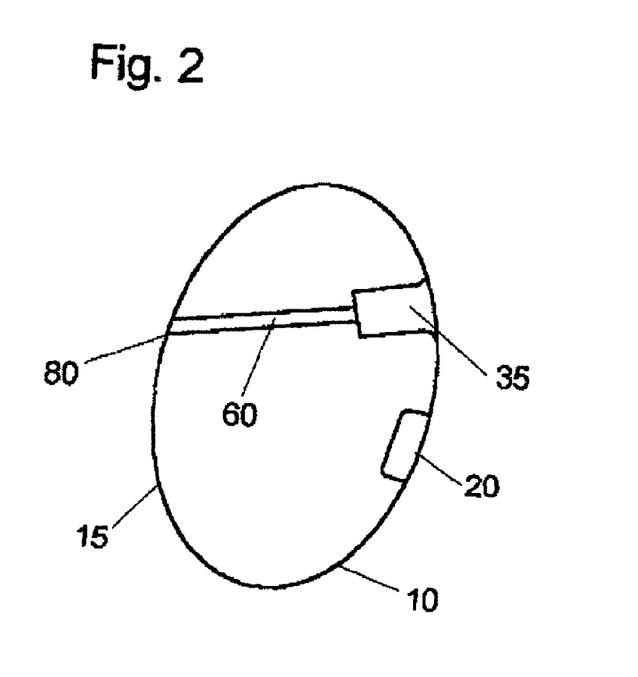

FIG. 2 shows the gas bag 10 according to FIG. 1 in the inflated state. It can be seen that the control band 60 is tensioned and has drawn, that is to say slipped, the envelope region 35 into the interior of the gas bag 10. By means of the internal pressure of the gas bag 10, the slipped-in envelope region 35 is pressed together, so that closing of the outflow orifice 40 closes.

In the exemplary embodiment according to FIGS. 1 and 2, the control band 60 may be connected in its middle region, i.e., in the region between the two ends 70 and 80, to the gas bag envelope 15. Such a connection may be formed, for example, by a tear-open seam or a touch-and-close fastening or the like. The function of such a pressure-controlled fastening element 95 is that a slipping in of the envelope region 35 occurs only when the gas bag 10 has reached a particular minimum pressure. The closing of the outflow orifice 40 thus takes place not only in a deployment-controlled manner, as without the fastening element, but also in a pressure-controlled manner, i.e., as a function of the internal pressure of the gas bag 10.

The closing of the gas bag occurs only when the fastening element opens by virtue of the internal pressure. Only then can the control band 60 draw the hose-shaped envelope region 35 into the gas bag.

Moreover, such a fastening element as described above may also be used in the other exemplary embodiments described below.

Figure 3:
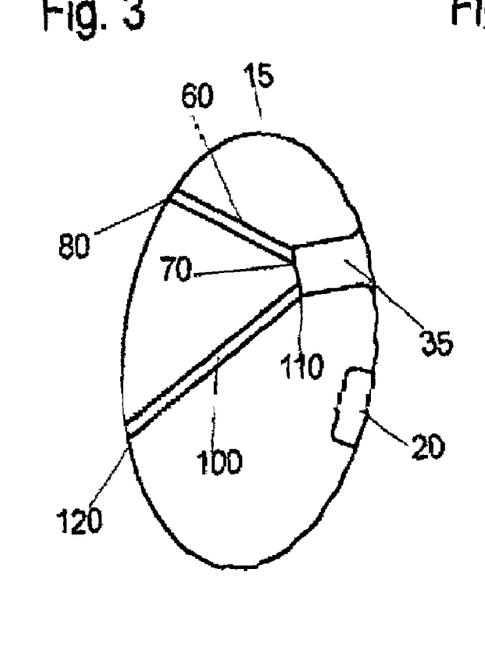
FIG. 3 shows a second exemplary embodiment of a gas bag according to the invention.

FIG. 3 shows a second exemplary embodiment of a gas bag according to the invention, and specifically in the inflated state, in which two control bands are used, the control band 60 and a further control band 100. The further control band 100 is connected at one end 110 to the envelope region 35 and at its other end 120 to the gas bag envelope 15. The two ends 70 and 110 of the two control bands 60 and of 100, respectively, are attached at different points, for example opposite points of the envelope region 35, and hold the envelope region 35 apart in such a way that crumpling of the envelope material is avoided and optimal pressing together and sealing off of the orifice by means of the internal pressure of the gas bag 10 is achieved.

Figure 4:
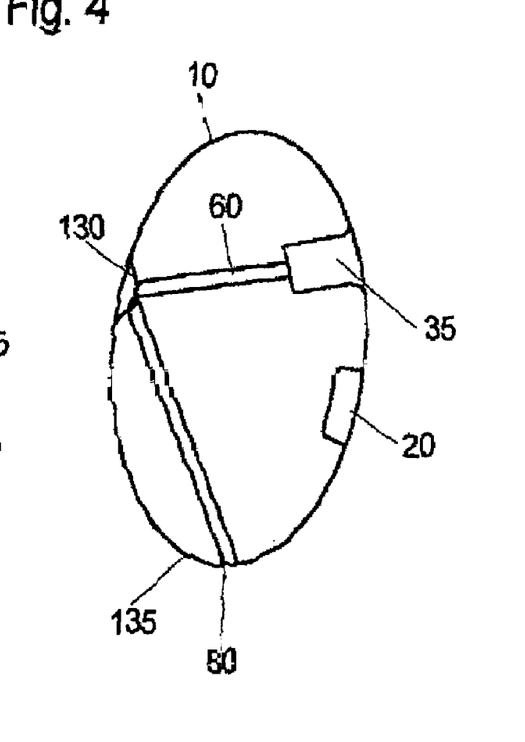
FIG. 4 shows a third exemplary embodiment of a gas bag according to the invention.

FIG. 4 shows a third exemplary embodiment of a gas bag according to the invention. A deflection device 130 formed as a loop is illustrated. The control band 60 is drawn through the loop 130 so that a deflection of the control band 60 fastened to the lateral region 135 of the gas bag envelope 15 occurs. The deflection device 130 provides an overall longer "draw-in travel." Moreover, a more controlled braking of selected airbag regions becomes possible.

Furthermore, by means of the deflection device, kind of logical "and" operation is provided. This is so because a slipping in of the envelope region 35 occurs only when the gas bag envelope 15 is sufficiently inflated both at the point at which the deflection device 130 is fastened and at the point at which the other end of the control band 60 is fastened.

Figure 5:
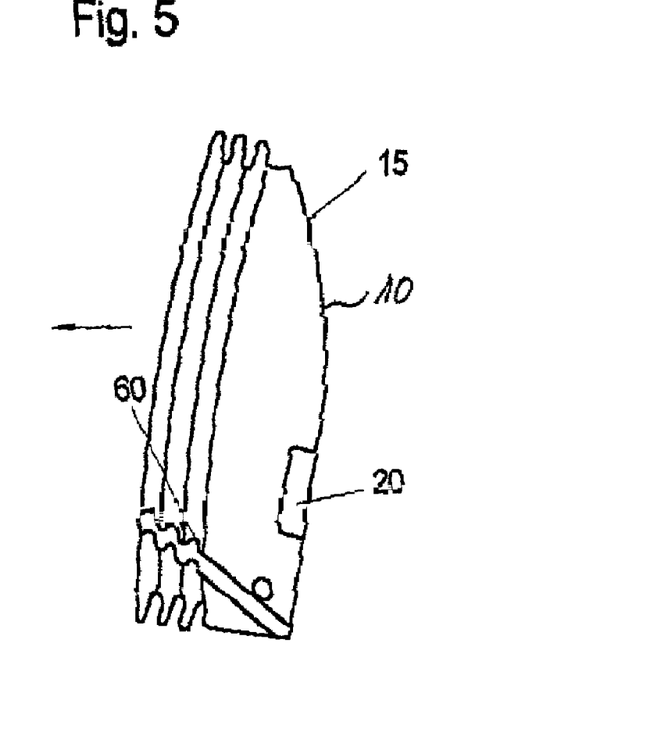
FIGS. 5 and 6 show a fourth exemplary embodiment of a gas bag according to the invention.
Figure 6:
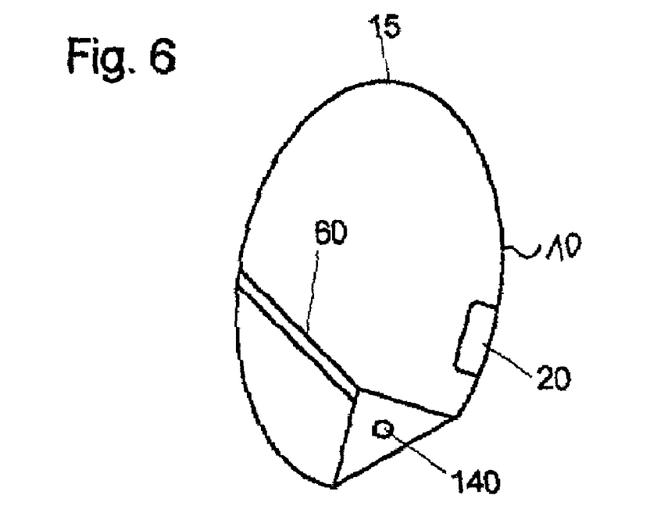

FIGS. 5 and 6 show a fourth exemplary embodiment of a gas bag according to the invention. The gas bag envelope 15 has as outflow orifice 140, in this case a vent hole which, according to FIG. 6, is slipped into the inner region of the gas bag 10.

FIG. 5 shows in this case the gas bag 10 at a moment when it is not yet fully deployed. The vent hole is therefore still open and gas can escape. In the illustration according to FIG. 6, the gas bag 10 is fully inflated, and the vent hole region is slipped into the gas bag interior, and is closed by means of the internal pressure of the gas bag.

Figure 7:
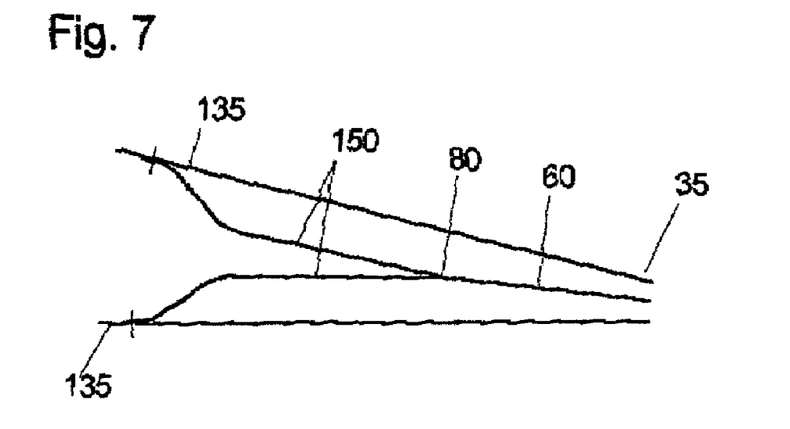
FIGS. 7 to 9 show a fifth exemplary embodiment of a gas bag according to the invention.
Figure 8:
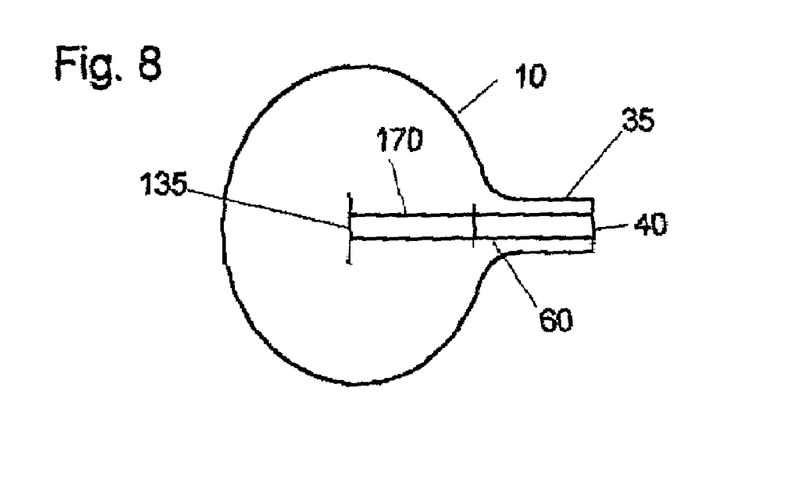
Figure 9:
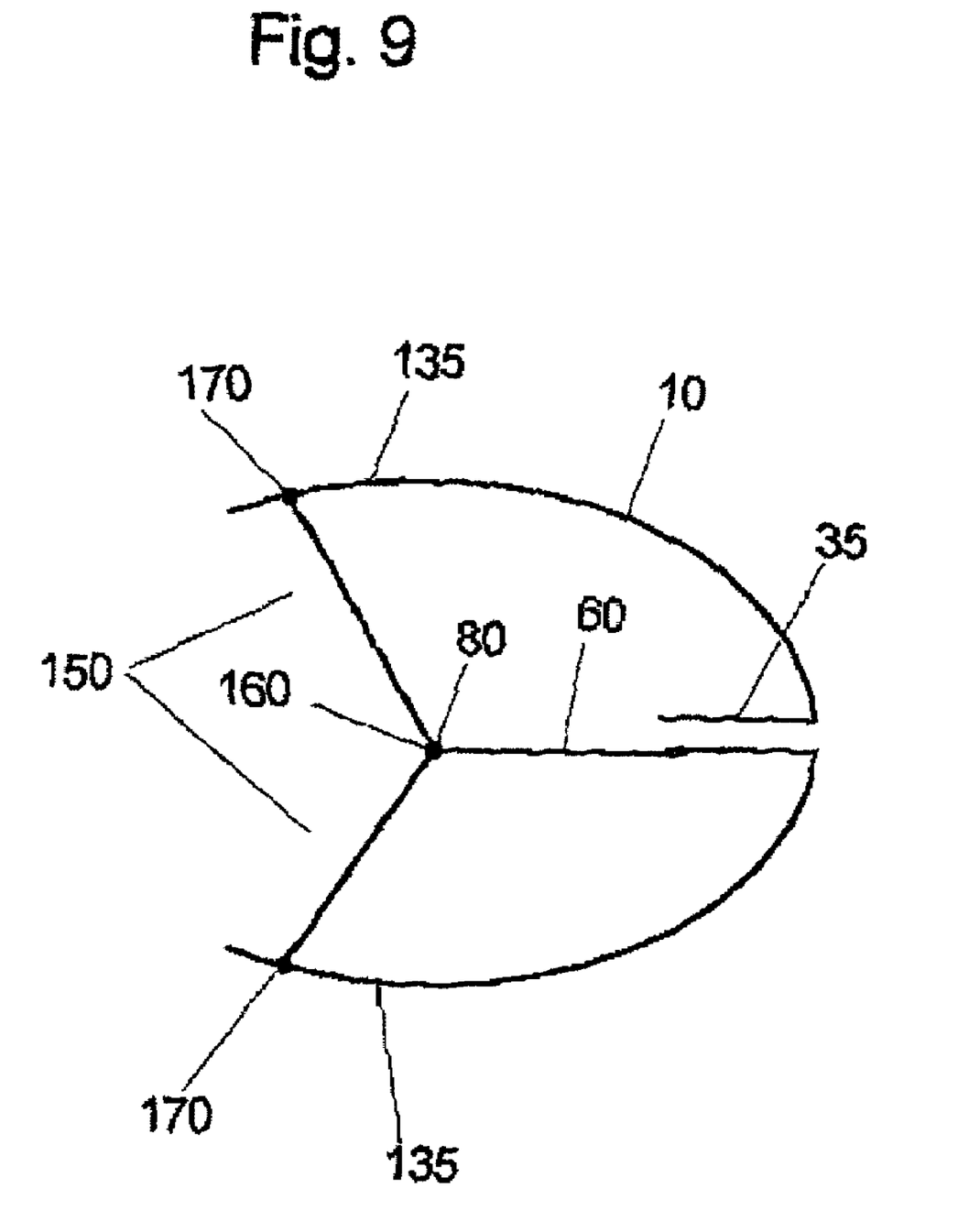

FIGS. 7 to 9 show a fifth exemplary embodiment of a gas bag according to the invention. In the illustrations according to FIGS. 7 and 8 (side view and top view, respectively), the gas bag 10 is not yet fully deployed and the envelope region 35 is not yet slipped into the gas bag interior.

In the illustration according to FIG. 9 (side view), the gas bag is inflated and the envelope region 35 is slipped in, with the result that the outflow orifice 40 is closed.

In the fifth exemplary embodiment, the outflow orifice 40 is kept open when the lateral deployment of the gas bag envelope is obstructed, for example in an "out of position" situation. By contrast, when the gas bag is deployed up to its intended thickness, the outflow orifice 40 closes.

This behavior of the gas bag is achieved by means of the two auxiliary control bands 150 which are each connected with one end 160 to the other end 80 of the control band 60 and with the other end 170 of each band 150 to the lateral gas bag envelope 135.

Figure 10:
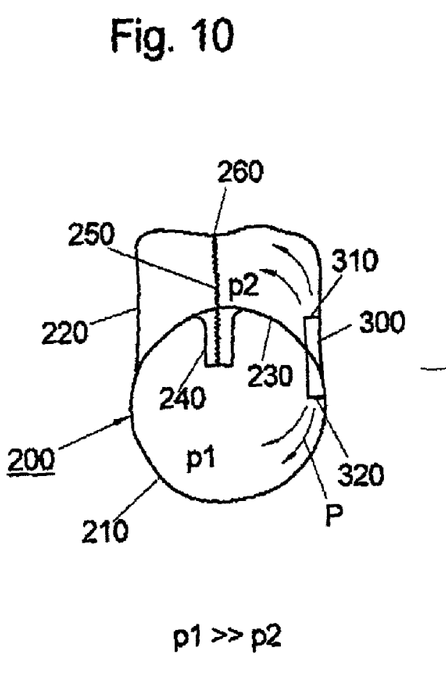
FIGS. 10 to 12 show a sixth exemplary embodiment of a gas bag according to the invention.
Figure 11:
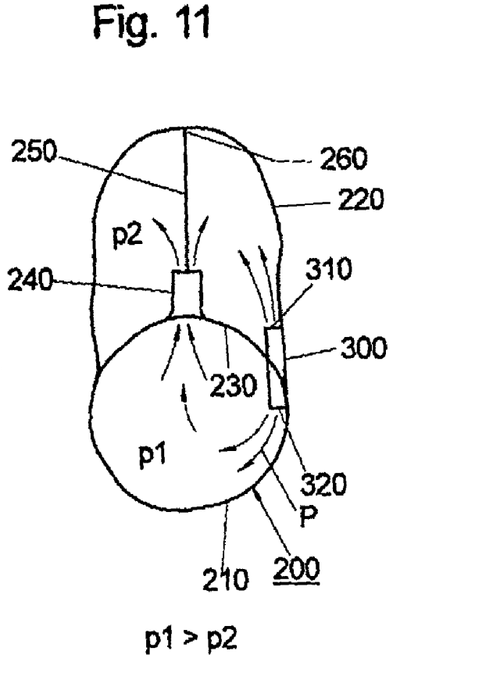
Figure 12:
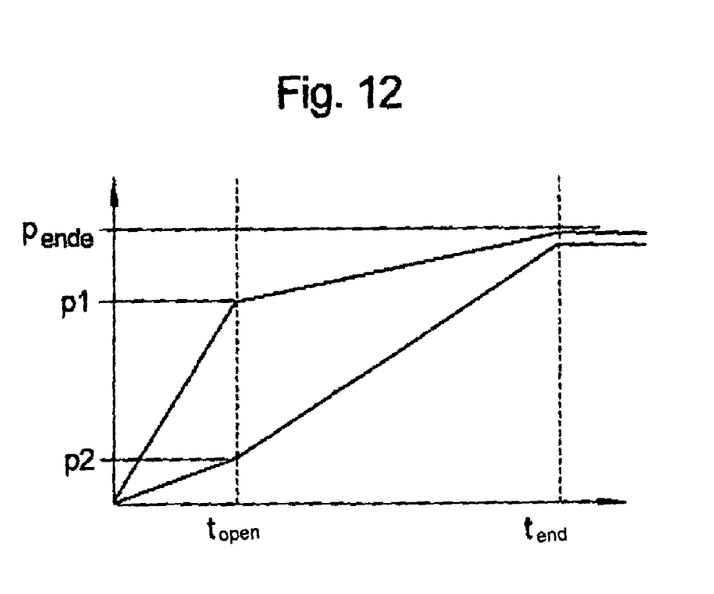

FIGS. 10 to 12 illustrate a sixth exemplary embodiment of a gas bag according to the invention. This gas bag is a two-chamber side airbag 200 which has a pelvic part gas bag 210 and a thoracic part gas bag 220. The pelvic part gas bag 210 is separated from the thoracic part gas bag 220 by a separating layer (separating membrane) 230 which is part of the gas bag envelope of the gas bag 200. The separating layer 230 has an overflow orifice 240 which may be formed by a "blow pipe" formed in the separating layer 230.

One end of a control band 250 is attached to the blow pipe 240. The other end of the control band 250 is fastened to the thoracic part gas bag 220 at a point 260. The two-chamber side airbag 200 is inflated by means of a gas generator 300. For this purpose, the gas generator 300 has a gas orifice 310 facing the thoracic part gas bag 220 and a gas orifice 320 facing the pelvic part gas bag 210. The gas generator 300 is designed in such a way that the gas stream flowing into the pelvic part gas bag 210 is exactly as large as the gas stream flowing into the thoracic part gas bag 220. The two part gas bags 210 and 220 have different volumes, so that, with an identical gas stream filling the bags 210 and 220, different pressure levels are built up therein. As a result, the pelvic part gas bag 210 is inflated markedly more quickly than the thoracic part gas bag 220. In this first phase of inflation, the blow pipe or the overflow orifice 240 is still closed due to the internal pressure in the pelvic part gas bag 210, so that no overflow of gas can occur between the pelvic part gas bag 210 and the thoracic part gas bag 220.

The time profile of the inflation of the two-chamber side airbag 200 according to FIG. 10 is illustrated in FIG. 12. Here, p1 designates the gas pressure in the pelvic part gas bag 210 and p2 the gas pressure in the thoracic part gas bag 220. It can be seen that, in a first phase between $t=0$ and $t=t_{open}$, the pelvic part gas bag 210 is inflated markedly more quickly than the thoracic part gas bag 220. As soon as the thoracic part gas bag 220 has been deployed to an extent such that its control band 250 is tautened, the blow pipe 240 located on the pelvic part gas bag 210 and previously extending into the pelvic part gas bag 210 is slipped out of the pelvic part gas bag and is slipped in to the thoracic part gas bag 220. As a result, the blow pipe 240 or the overflow orifice 240 is opened, and an overflow of gas from the pelvic part gas bag 210 into the thoracic part gas bag 220 occurs. This is shown in FIG. 11.

The pressure profiling time during the phase of the overflow of gas from the pelvic part gas bag 210 into the thoracic part gas bag 220 is illustrated in FIG. 12. In the overflow phase, i.e., the second time phase of inflation of the two-chamber side airbag 200, lies between the time points $t=t_{open}$ and $t=t_{end}$. After the time point $t=t_{end}$ is reached, the two-chamber side airbag 200 is fully inflated, so that there is no longer any appreciable change in the pressure in the gas bag.

The two-chamber side airbag 200 according to FIGS. 10 to 12 is therefore a gas bag with a pelvic part gas bag 210 and with a thoracic part gas bag 220 which are inflated successively in time. First, a relatively rapid inflation of the pelvic part gas bag 210 takes place, so that a relatively high gas pressure builds up very quickly in the pelvic part gas bag 210. As a result of this pressure build-up, in the event of a side impact on the vehicle, the vehicle occupant is pushed relatively quickly out of the intrusion region, so that injuries particularly to the pelvic region of the vehicle occupant are prevented.

After the pelvic part gas bag 210 has performed its main task of pushing the vehicle occupant out of the intrusion region, a particularly high pressure in the pelvic part gas bag 210 is no longer required. Thus, the high gas pressure present in the pelvic part gas bag 210 can then even be used for inflating the thoracic part gas bag 220. This "co-utilization" of the gas pressure in the thoracic part gas bag 210 has two advantages. On one hand, the inflation of the thoracic part gas bag 220 is accelerated, because both the gas of the gas generator 300 and the gas from the pelvic part gas bag 210 are used for inflation. On the other hand, gas is also saved, because the gas of the pelvic part gas bag 210 is used twice, in a first phase for the inflation of the pelvic part gas bag 210, and in a second phase for the inflation of the thoracic part gas bag 220. Owing to the multiple use of the gas, the gas generator may be dimensioned relatively small, or smaller than would otherwise be necessary.

In FIGS. 10 and 11, and also below in FIGS. 13 and 14, arrows P mark the gas stream within the gas bag; for the sake of clarity, here, only a single arrow is given as a reference symbol in each of the figures.

Figure 13:
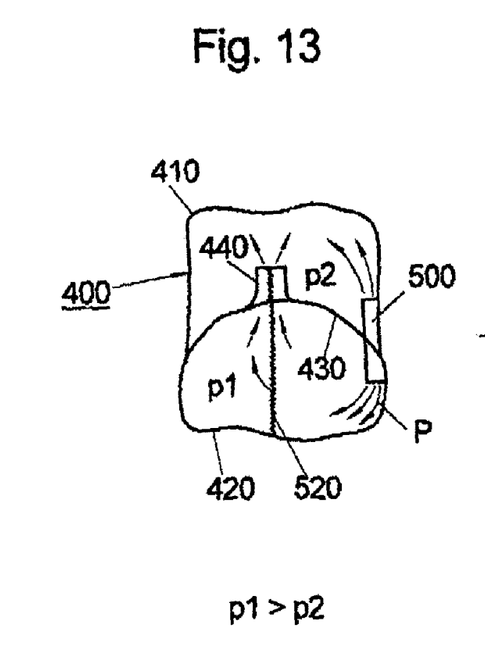
FIGS. 13 to 15 show a seventh exemplary embodiment of a gas bag according to the invention.
Figure 14:
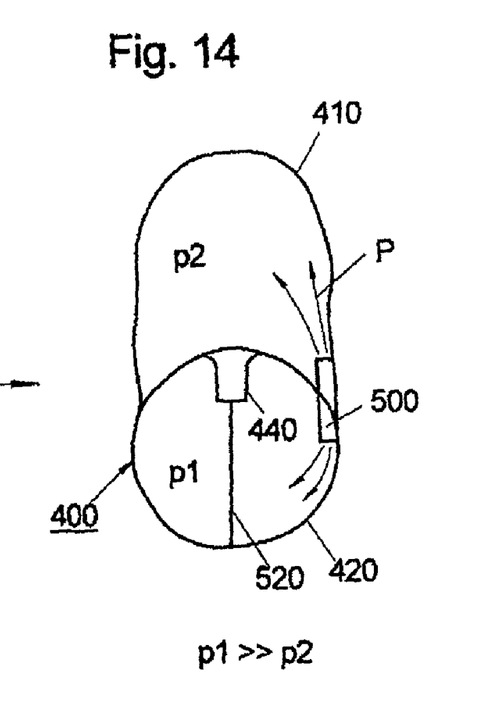
Figure 15:
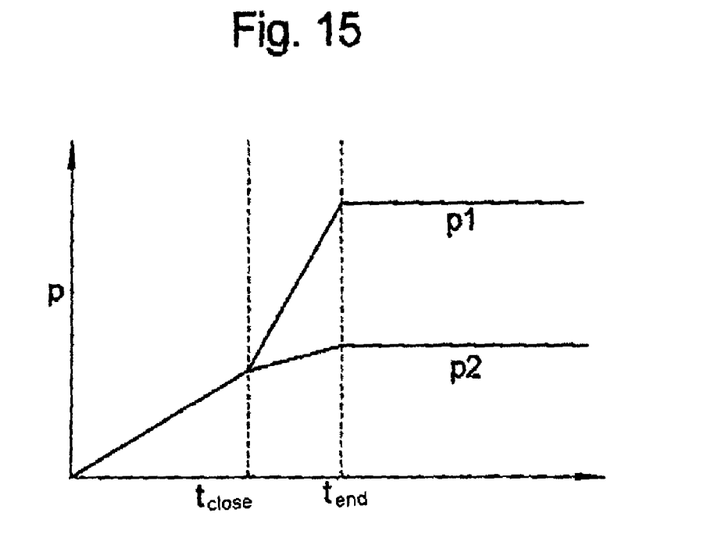

FIGS. 13 to 15 illustrate a seventh exemplary embodiment of a gas bag according to the invention. The gas bag 400 has an upper part gas bag 410 and a lower part gas bag 420. The two part gas bags 410 and 420 are separated by a separating layer 430. In the separating layer 430 is provided an overflow orifice 440 in the form of a blowpipe, through which gas can flow from the lower part gas bag 420 into the upper part gas bag 410 in a first phase of inflation (see FIG. 13).

The gas bag 400 is inflated by means of a gas generator 500 which is dimensioned such that the pressure build-up in the two part gas bags 410 and 420 is relatively similar in a first phase of inflation. This is shown in FIG. 15 where it can be seen that, between the time point t=0 and t=$t_{close}$, the pressure profiles p1 and p2 in the two part gas bags 410 and 420 are relatively similar. In FIG. 15, the reference symbol p1 in this case designates the gas pressure in the lower part gas bag 420 and the reference symbol p2 the gas pressure in the upper part gas bag 410.

After the conclusion of the first phase of inflation, the lower part gas bag 420 has been deployed to an extent such that a control band 520 connected to the blow pipe 440 and the gas bag envelope of the lower part gas bag 420 draws the blow pipe 440 out of the region of the upper part gas bag 410 and slips it into the region of the lower part gas bag 420.

FIG. 14 shows the gas bag 400 after the overslipping of the blow pipe 440. As a result of the internal pressure in the lower part gas bag 420, the blow pipe 440 is closed, so that an overflow of gas between the two part gas bags 410 and 420 can no longer occur. Since the two part gas bags 410 and 420 are separated from one another by the blow pipe 440 operating as a valve, a different gas pressure can be formed in this case in the two part gas bags 410 and 420. Whether a pressure difference is formed in the two part gas bags 410 and 420, and how great the pressure difference in the two part gas bags 410 and 420 is, depends on the dimensioning of the gas generator 500.

FIG. 15 illustrates, by way of example, the time profile of the gas pressure in the two part gas bags 410 and 420 after the closing of the blow pipe 440. In the period of time between the time points t=$t_{close}$ and t=$t_{end}$, the two gas pressures p1 and p2 diverge from one another, such that the pressure p1 in the lower part gas bag 420 rises more quickly than the gas pressure in the upper part gas bag 410. After the conclusion of the inflation, the gas pressure in the two part gas bags remains constant. This is illustrated in FIG. 15 for the time point t>$t_{end}$.

In the exemplary embodiment according to FIGS. 13 to 15, the blow pipe 440 or the valve formed by the blow pipe 440 ensures that in a first stage of inflation, the two part gas bags 410 and 420 follow essentially a comparable pressure profile. After the conclusion of this first phase of inflation of the gas bag, the gas stream between the two part gas bags 410 and 420 is interrupted by means of the valve or the blow pipe 440, so that each of the two part gas bags 410 and 420 can reach their respective final pressures intended.

The priority application, German Patent Application No. DE 102 36 859.7 filed Aug. 7, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A gas bag for an airbag module, comprising:
  a gas bag envelope, wherein the gas bag envelope includes a gas bag envelope portion that is adapted to be moved into the interior of the gas bag envelope during inflation of the gas bag envelope;
  at least one outflow and/or overflow orifice, wherein the at least one orifice is located on the gas bag envelope portion that moves into the interior of the gas bag envelope; and
  at least one control band, wherein one end of the control band is attached to the gas bag envelope and the other end of the control band is attached to the gas bag envelope portion that moves into the interior of the gas bag envelope.

2. A gas bag for an airbag module for protecting a vehicle occupant, comprising:
  a gas bag envelope;
  at least one initially closed closable outflow and/or overflow orifice in the gas bag envelope; and
  at least one control band arranged to, during the inflation of the gas bag, when a predetermined state of deployment of the gas bag is reached, open the at least one outflow and/or overflow orifice, or close the at least one outflow and/or overflow orifice, the at least one control band having one end and another end,
  wherein the at least one outflow and/or overflow orifice is disposed on a part of the gas bag envelope that is adapted to slip into the gas bag envelope when the predetermined state of deployment of the gas bag is reached,
  wherein the one end of the at least one control band is fastened to the gas bag envelope in a region of the at least one outflow and/or overflow orifice, and the other end of the at least one control band is connected to the gas bag envelope in such a way that, when the predetermined state of deployment is reached, the at least one control band:
  (a) slips the part of the gas bag envelope, which is located in the region of the at least one outflow and/or overflow orifice into the gas bag, such that the at least one outflow and/or overflow orifice is closed by the slipped in part of the gas bag envelope by the internal pressure of the gas bag, or
  (b) slips out the part of the gas bag envelope, which is located in the region of the at least one outflow and/or overflow orifice and is slipped into the gas bag, such that the previously closed at least one outflow and/or overflow orifice is opened.

3. The gas bag as claimed in claim 2, wherein the gas bag further comprises:
  two part gas bags, the part gas bags being flow connected to one another, and wherein the at least one outflow and/or overflow orifice is arranged between the part gas bags.

4. The gas bag as claimed in claim 2, wherein the at least one outflow and/or overflow orifice is formed on an outer wall of the gas bag such that when the at least one outflow and/or overflow orifice is open, gas emerges from the gas bag.

5. The gas bag as claimed in claim 2, wherein the other end of the at least one control band is fastened to the gas bag envelope in a region facing a vehicle occupant.

6. The gas bag as claimed in claim 2, wherein the other end of the at least one control band is fastened in a lateral region of the gas bag envelope.

7. The gas bag as claimed in claim 2, further comprising:
  a deflection device arranged on an inside of the gas bag envelope, the at least one control band being led over the deflection device.

8. The gas bag as claimed in claim 7, wherein the deflection device is fastened to the gas bag envelope in a region facing a vehicle occupant, and the other end of the at least one control band is fastened in a lateral region of the gas bag envelope.

9. The gas bag envelope as claimed in claim 7, wherein the deflection device is formed by a loop through which the at least one control band is drawn.

10. The gas bag as claimed in claim 2, wherein the at least one control band is connected at its other end to one end of at least two auxiliary control bands, the other end of the at least one control band being connected to the gas bag envelope, either directly or indirectly, via secondary bands or via deflection devices.

11. The gas bag as claimed in claim 2, further comprising:
at least one further control band having one end and another end, the one end of the at least one further control band being attached in the region of the at least one outflow and/or overflow orifice at a point opposite the one end of the at least one control band.

12. The gas bag as claimed in claim 2, wherein the gas bag envelope comprises a hose shaped or blow pipe shaped design in the region of the at least one outflow and/or overflow orifice.

13. The gas bag as claimed in claim 2, wherein the at least one control band is fastened at least one point in a region between its one end and another end to the gas bag envelope by means of a fastening element, the fastening element being designed so as to release fastening when a predetermined internal pressure of the gas bag is reached.

14. The gas bag as claimed in claim 13, wherein the fastening element comprises a tear open seam which connects the gas bag envelope and the at least one control band to one another.

15. The gas bag as claimed in claim 13, wherein the fastening element comprises a touch and close fastening which connects the gas bag envelope and the at least one control band to one another.

16. The gas bag as claimed in claim 2, wherein the gas bag comprises a two chamber side airbag with a pelvic part gas bag and with a thoracic part gas bag.

17. The gas bag as claimed in claim 16, wherein the thoracic part gas bag and the pelvic part gas bag are connected to one another by means of the at least one outflow and/or overflow orifice.

18. The gas bag as claimed in claim 17, wherein the gas bag is arranged such that the pelvic part gas bag is inflated more quickly than the thoracic part gas bag, and wherein after the conclusion of a first phase of inflation of the gas bag, the outflow and/or overflow orifice is opened such that gas of the pelvic part gas bag can flow into the thoracic part gas bag.

19. The gas bag as claimed in claim 2, wherein the gas bag further comprises two part gas bags, and the at least one outflow and/or overflow orifice is arranged to be activated in such a way that, in a first phase of inflation of the gas bag, the part gas bags are inflated uniformly, and after the conclusion of the first phase of inflation, the at least one outflow and/or overflow orifice is closed so that a different gas pressure can be formed in the two part gas bags.

* * * * *